US012417777B2

(12) United States Patent
Aihara

(10) Patent No.: US 12,417,777 B2
(45) Date of Patent: Sep. 16, 2025

(54) INFORMATION PROCESSING DEVICE AND METHOD FOR OUTPUTTING A TARGET SOUND SIGNAL FROM A MIXED SOUND SIGNAL

(71) Applicant: Mitsubishi Electric Corporation, Tokyo (JP)

(72) Inventor: Ryo Aihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 146 days.

(21) Appl. No.: 18/239,289

(22) Filed: Aug. 29, 2023

(65) Prior Publication Data

US 2023/0419980 A1 Dec. 28, 2023

Related U.S. Application Data

(63) Continuation of application No. PCT/JP2021/014790, filed on Apr. 7, 2021.

(51) Int. Cl.
*G10L 21/0308* (2013.01)
*G10L 21/0216* (2013.01)
(Continued)

(52) U.S. Cl.
CPC ...... *G10L 21/0308* (2013.01); *G10L 21/0216* (2013.01); *G10L 25/18* (2013.01); *G10L 25/21* (2013.01)

(58) Field of Classification Search
CPC . G10L 21/0308; G10L 21/0216; G10L 25/18; G10L 25/21; G10L 25/51; G10L 21/0264; G10L 2021/02166
See application file for complete search history.

(56) References Cited

U.S. PATENT DOCUMENTS 11,398,241 B1 * 7/2022 Mansour ................ H04R 1/326
11,508,388 B1 * 11/2022 Souden .................... G06N 3/08
(Continued)

FOREIGN PATENT DOCUMENTS

JP 2010-239424 A 10/2010
JP 2017-9700 A 1/2017
(Continued)

OTHER PUBLICATIONS

Delcroix et al., "Single Channel Target Speaker Extraction and Recognition with Speaker Beam", IEEE ICASSP, 2018, pp. 5554-5558.

(Continued)

*Primary Examiner* — Douglas Godbold
(74) *Attorney, Agent, or Firm* — Birch, Stewart, Kolasch & Birch, LLP

(57) ABSTRACT

An information processing device includes an acquisition unit that acquires sound source position information and so forth, a sound feature value extraction unit that extracts a plurality of sound feature values based on the mixed sound signal, an emphasis unit that emphasizes a sound feature value in a target sound direction based on the sound source position information, an estimation unit that estimates the target sound direction based on the sound source position information and so forth, a mask feature value extraction unit that extracts a mask feature value based on the estimated target sound direction and so forth, a generation unit that generates a target sound direction emphasis sound signal and generates a target sound direction masking sound signal, and a target sound signal output unit that outputs a target sound signal by using the target sound direction emphasis sound signal and so forth.

7 Claims, 12 Drawing Sheets

(51) Int. Cl.
*G10L 25/18* (2013.01)
*G10L 25/21* (2013.01)

(56) References Cited

U.S. PATENT DOCUMENTS

| | | | | |
|---|---|---|---|---|
| 11,574,628 | B1 * | 2/2023 | Kumatani | G06N 3/084 |
| 2008/0167869 | A1 * | 7/2008 | Nakadai | G10L 21/028 381/94.7 |
| 2016/0240210 | A1 * | 8/2016 | Lou | G10L 21/0388 |
| 2016/0372129 | A1 * | 12/2016 | Nakadai | G10L 21/028 |
| 2019/0074030 | A1 * | 3/2019 | Omachi | G10L 25/78 |
| 2020/0296507 | A1 * | 9/2020 | Hayakawa | H04R 3/005 |
| 2020/0322722 | A1 * | 10/2020 | Chen | H04R 3/005 |
| 2020/0365152 | A1 * | 11/2020 | Han | G10L 19/008 |
| 2021/0125625 | A1 * | 4/2021 | Huang | G10L 25/21 |
| 2021/0216687 | A1 * | 7/2021 | Nakatani | G10L 21/0232 |
| 2021/0217432 | A1 * | 7/2021 | Zheng | G10L 21/02 |
| 2022/0101831 | A1 * | 3/2022 | Xu | G10L 25/21 |
| 2022/0116729 | A1 * | 4/2022 | Ukai | G06T 7/70 |
| 2022/0150661 | A1 * | 5/2022 | Taghizadeh | G10L 25/18 |
| 2022/0301575 | A1 * | 9/2022 | Yasuda | G10L 25/18 |
| 2022/0399026 | A1 * | 12/2022 | Gong | G10L 19/008 |
| 2023/0026735 | A1 * | 1/2023 | Montazeri | H04R 5/04 |
| 2023/0067132 | A1 * | 3/2023 | Ochiai | G10L 25/93 |
| 2023/0410829 | A1 * | 12/2023 | Cartwright | G10L 25/30 |
| 2024/0212701 | A1 * | 6/2024 | Guerin | G10L 21/0208 |

FOREIGN PATENT DOCUMENTS

| | | | |
|---|---|---|---|
| WO | WO 2006/059806 | A1 | 6/2006 |
| WO | WO 2016/143125 | A1 | 9/2016 |

OTHER PUBLICATIONS

International Search Report for PCT/JP2021/014790 mailed on Jun. 22, 2021.

Luo et al., "Conv-TasNet : Surpassing Ideal Time-Frequency Magnitude Masking for Speech Separation", May 15, 2019, pp. 1-12.

Vaswani et al., "Attention is all you Need", 31st Conference on Neural Information Processing Systems, Long Beach, CA, USA, Dec. 6, 2017, Total pp. 15.

* cited by examiner

INFORMATION PROCESSING DEVICE AND METHOD FOR OUTPUTTING A TARGET SOUND SIGNAL FROM A MIXED SOUND SIGNAL

CROSS-REFERENCE TO RELATED APPLICATION

This application is a continuation application of International Application No. PCT/JP2021/014790 having an international filing date of Apr. 7, 2021.

BACKGROUND OF THE INVENTION

1. Field of the Invention

The present disclosure relates to an information processing device, and an output method.

2. Description of the Related Art

Speeches are mixed together when a plurality of speakers speak at the same time. There are cases where it is desired to extract the speech of a target speaker from the mixed speech. When extracting the speech of the target speaker, a method for suppressing noise can be considered, for example. Here, a method for suppressing noise has been proposed (see Patent Reference 1).

Patent Reference 1: Japanese Patent Application Publication No. 2010-239424

Patent Reference 2: WO 2016/143125

Non-patent Reference 1: Yi Luo, Nima Mesgarani, "Conv-TasNet: Surpassing Ideal Time-Frequency Magnitude Masking for Speech Separation", 2019

Non-patent Reference 2: Ashish Vaswani et al., "Attention Is All You Need", in Proc. NIPS, 2017

Additionally, when an angle between a direction of incidence of a target sound (e.g., speech of the target speaker) upon a microphone and a direction of incidence of a masking sound (e.g., speech of a disturbing speaker) upon the microphone is small, there are cases where it is difficult for a device to output a target sound signal as a signal representing the target sound even by use of the above-described technology.

SUMMARY OF THE INVENTION

An object of the present disclosure is to output the target sound signal.

An information processing device according to an aspect of the present disclosure is provided. The information processing device includes an acquisition unit that acquires sound source position information as position information on a sound source of a target sound, a mixed sound signal as a signal representing a mixed sound including the target sound and a masking sound, and a learned model, a sound feature value extraction unit that extracts a plurality of sound feature values based on the mixed sound signal, an emphasis unit that emphasizes a sound feature value in a target sound direction as a direction of the target sound among the plurality of sound feature values based on the sound source position information, an estimation unit that estimates the target sound direction based on the plurality of sound feature values and the sound source position information, a mask feature value extraction unit that extracts a mask feature value, as a feature value in a state in which a feature value in the target sound direction is masked, based on the estimated target sound direction and the plurality of sound feature values, a generation unit that generates a target sound direction emphasis sound signal, as a sound signal in which the target sound direction is emphasized, based on the emphasized sound feature value and generates a target sound direction masking sound signal, as a sound signal in which the target sound direction is masked, based on the mask feature value, and a target sound signal output unit that outputs a target sound signal as a signal representing the target sound by using the target sound direction emphasis sound signal, the target sound direction masking sound signal and the learned model.

According to the present disclosure, the target sound signal can be outputted.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein.

DETAILED DESCRIPTION OF THE INVENTION

Embodiments will be described below with reference to the drawings. The following embodiments are just examples and a variety of modifications are possible within the scope of the present disclosure.

First Embodiment

Figure 1:
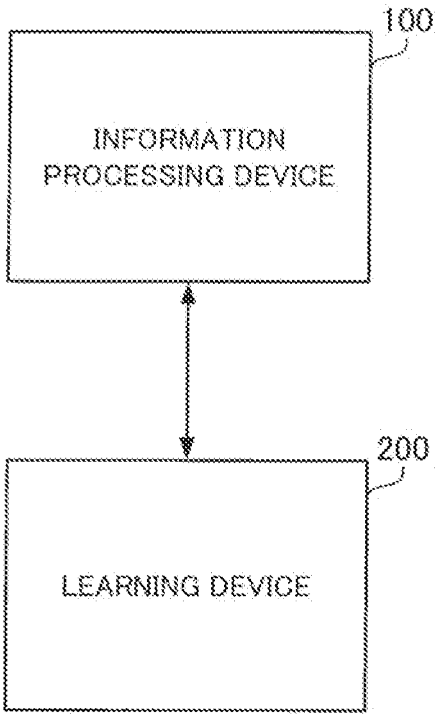
FIG. 1 is a diagram showing an example of a target sound signal output system in a first embodiment.

FIG. 1 is a diagram showing an example of a target sound signal output system in a first embodiment. The target sound signal output system includes an information processing device 100 and a learning device 200. The information processing device 100 is a device that executes an output method. The information processing device 100 outputs a target sound signal by using a learned model. The learned model is generated by the learning device 200.

The information processing device 100 will be described in a utilization phase. The learning device 200 will be described in a learning phase. First, the utilization phase will be described below.

<Utilization Phase>

Figure 2:
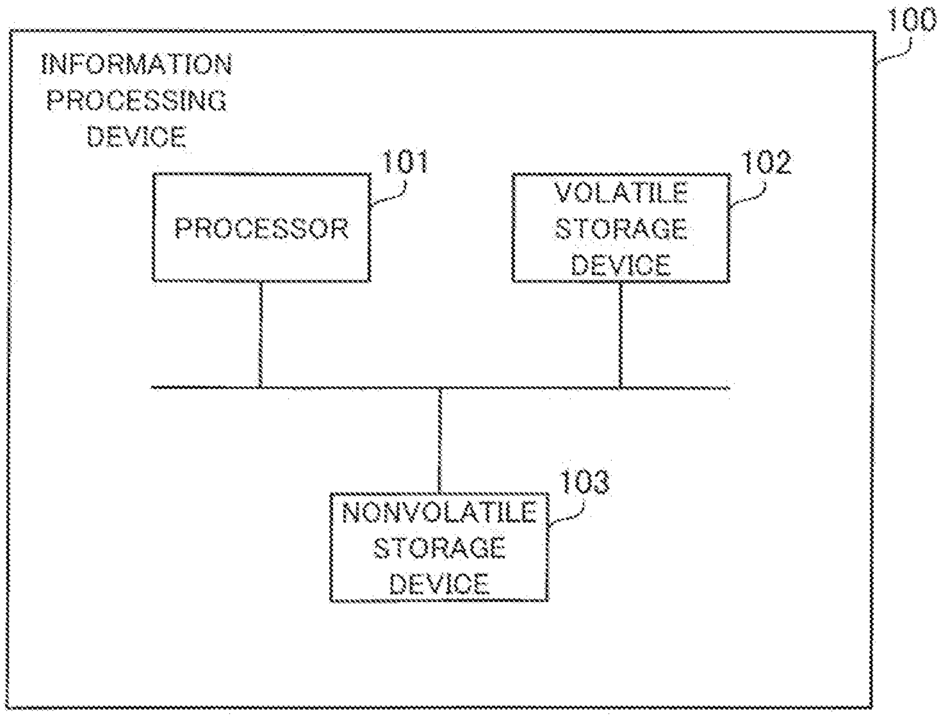
FIG. 2 is a diagram showing hardware included in an information processing device in the first embodiment.

FIG. 2 is a diagram showing hardware included in the information processing device in the first embodiment. The information processing device 100 includes a processor 101, a volatile storage device 102 and a nonvolatile storage device 103.

The processor 101 controls the whole of the information processing device 100. The processor 101 is a Central Processing Unit (CPU), a Field Programmable Gate Array (FPGA) or the like, for example. The processor 101 can also be a multiprocessor. Further, the information processing device 100 may include a processing circuitry. The processing circuitry may be either a single circuit or a combined circuit.

The volatile storage device 102 is main storage of the information processing device 100. The volatile storage device 102 is a Random Access Memory (RAM), for example. The nonvolatile storage device 103 is auxiliary storage of the information processing device 100. The nonvolatile storage device 103 is a Hard Disk Drive (HDD) or a Solid State Drive (SSD), for example.

Further, a storage area secured by the volatile storage device 102 or the nonvolatile storage device 103 is referred to as a storage unit.

Next, functions included in the information processing device 100 will be described below.

Figure 3:
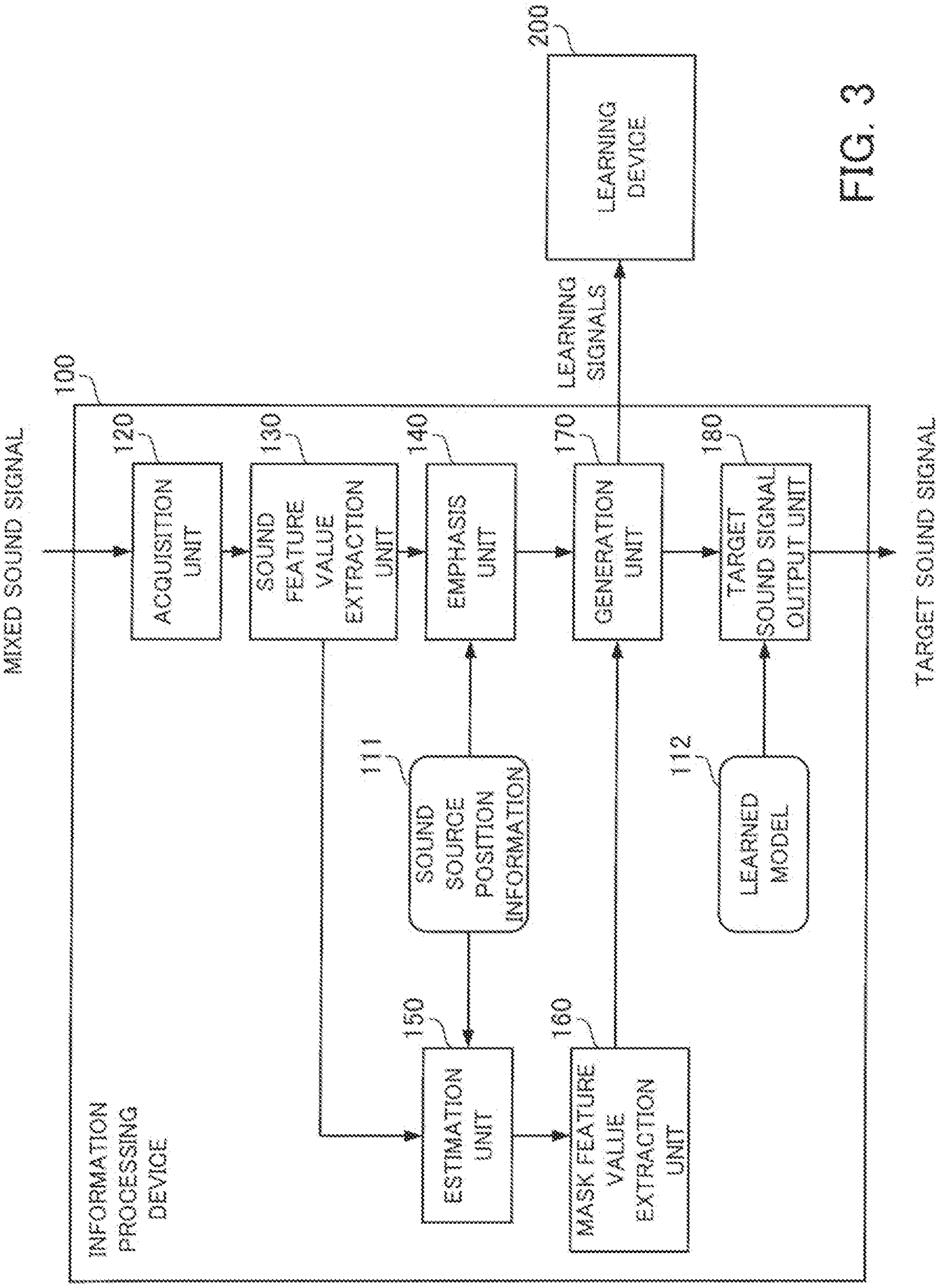
FIG. 3 is a block diagram showing functions of the information processing device in the first embodiment.

FIG. 3 is a block diagram showing the functions of the information processing device in the first embodiment. The information processing device 100 includes an acquisition unit 120, a sound feature value extraction unit 130, an emphasis unit 140, an estimation unit 150, a mask feature value extraction unit 160, a generation unit 170 and a target sound signal output unit 180.

Part or all of the acquisition unit 120, the sound feature value extraction unit 130, the emphasis unit 140, the estimation unit 150, the mask feature value extraction unit 160, the generation unit 170 and the target sound signal output unit 180 may be implemented by a processing circuitry. Further, part or all of the acquisition unit 120, the sound feature value extraction unit 130, the emphasis unit 140, the estimation unit 150, the mask feature value extraction unit 160, the generation unit 170 and the target sound signal output unit 180 may be implemented as modules of a program executed by the processor 101. For example, the program executed by the processor 101 is referred to also as an output program. The output program has been recorded in a record medium, for example.

The storage unit may store sound source position information 111 and a learned model 112. The sound source position information 111 is position information on a sound source of the target sound. For example, when the target sound is a speech uttered by the target speaker, the sound source position information 111 is position information on the target speaker.

The acquisition unit 120 acquires the sound source position information 111. For example, the acquisition unit 120 acquires the sound source position information 111 from the storage unit. Here, the sound source position information 111 may be stored in an external device (e.g., cloud server). In the case where the sound source position information 111 is stored in an external device, the acquisition unit 120 acquires the sound source position information 111 from the external device.

The acquisition unit 120 acquires the learned model 112. For example, the acquisition unit 120 acquires the learned model 112 from the storage unit. Further, for example, the acquisition unit 120 acquires the learned model 112 from the learning device 200.

The acquisition unit 120 acquires a mixed sound signal. For example, the acquisition unit 120 acquires the mixed sound signal from a microphone array including N microphones (N: integer greater than or equal to 2). The mixed sound signal is a signal representing a mixed sound including a target sound and a masking sound. The mixed sound signal may be represented as N sound signals. Incidentally, the target sound is a speech uttered by the target speaker, a sound uttered by an animal, or the like, for example. The masking sound is a sound that disturbs the target sound. Further, the mixed sound can include noise. In the following description, the mixed sound is assumed to include the target sound, the masking sound and the noise.

The sound feature value extraction unit 130 extracts a plurality of sound feature values based on the mixed sound signal. For example, the sound feature value extraction unit 130 extracts a time series of power spectra obtained by performing short-time Fourier transform (STFT) on the mixed sound signal as the plurality of sound feature values. Incidentally, the plurality of extracted sound feature values may be represented as N sound feature values.

The emphasis unit 140 emphasizes a sound feature value in a target sound direction among the plurality of sound feature values based on the sound source position information 111. For example, the emphasis unit 140 emphasizes the sound feature value in the target sound direction by using the plurality of sound feature values, the sound source position information 111 and a Minimum Variance Distortionless Response (MVDR) beam former.

The estimation unit 150 estimates the target sound direction based on the plurality of sound feature values and the sound source position information 111. Specifically, the estimation unit 150 estimates the target sound direction by using expression (1).

"$l$" represents time. "k" represents frequency. "$x_{lk}$" represents a sound feature value corresponding to a sound signal acquired from a microphone that is the closest to the sound source position of the target sound identified based on the sound source position information 111. "$x_{lk}$" may be regarded as an STFT spectrum. "$a_{\theta,k}$" represents a steering vector in a certain angular direction θ. "H" represents conjugate transposition.

$$\theta_{lk}=\arg\max_{\theta}|a_{\theta,k}^{H}x_{lk}|^2 \tag{1}$$

The mask feature value extraction unit 160 extracts a mask feature value based on the estimated target sound direction and the plurality of sound feature values. The mask feature value is a feature value in a state in which a feature value in the target sound direction is masked. The process of extracting the mask feature value will be described in detail below. The mask feature value extraction unit 160 generates a directional mask based on the target sound direction. The directional mask is a mask for extracting sound in which the sound of the target sound direction is emphasized. The mask is a matrix of the same size as the sound feature value. When an angular range of the target sound direction is ω, the directional mask $M_{lk}$ is represented by expression (2)

$$M_{lk} = \begin{cases} 1, & (\theta_{lk} \in \omega) \\ 0, & \text{(otherwise)} \end{cases} \tag{2}$$

The mask feature value extraction unit 160 extracts the mask feature value by multiplying the plurality of sound feature values by the element-wise product of the mask matrix.

The generation unit 170 generates a sound signal in which the sound of the target sound direction is emphasized (hereinafter referred to as a target sound direction emphasis sound signal) based on the sound feature value emphasized by the emphasis unit 140. For example, the generation unit 170 generates the target sound direction emphasis sound signal by using the sound feature value emphasized by the emphasis unit 140 and inverse short-time Fourier transform (ISTFT).

The generation unit 170 generates a sound signal in which the sound of the target sound direction is masked (hereinafter referred to as a target sound direction masking sound signal) based on the mask feature value. For example, the generation unit 170 generates the target sound direction masking sound signal by using the mask feature value and inverse short-time Fourier transform.

The target sound direction emphasis sound signal and the target sound direction masking sound signal may be inputted to the learning device 200 as learning signals.

The target sound signal output unit 180 outputs a target sound signal by using the target sound direction emphasis sound signal, the target sound direction masking sound signal and the learned model 112. Here, a configuration example of the learned model 112 will be described below.

Figure 4:
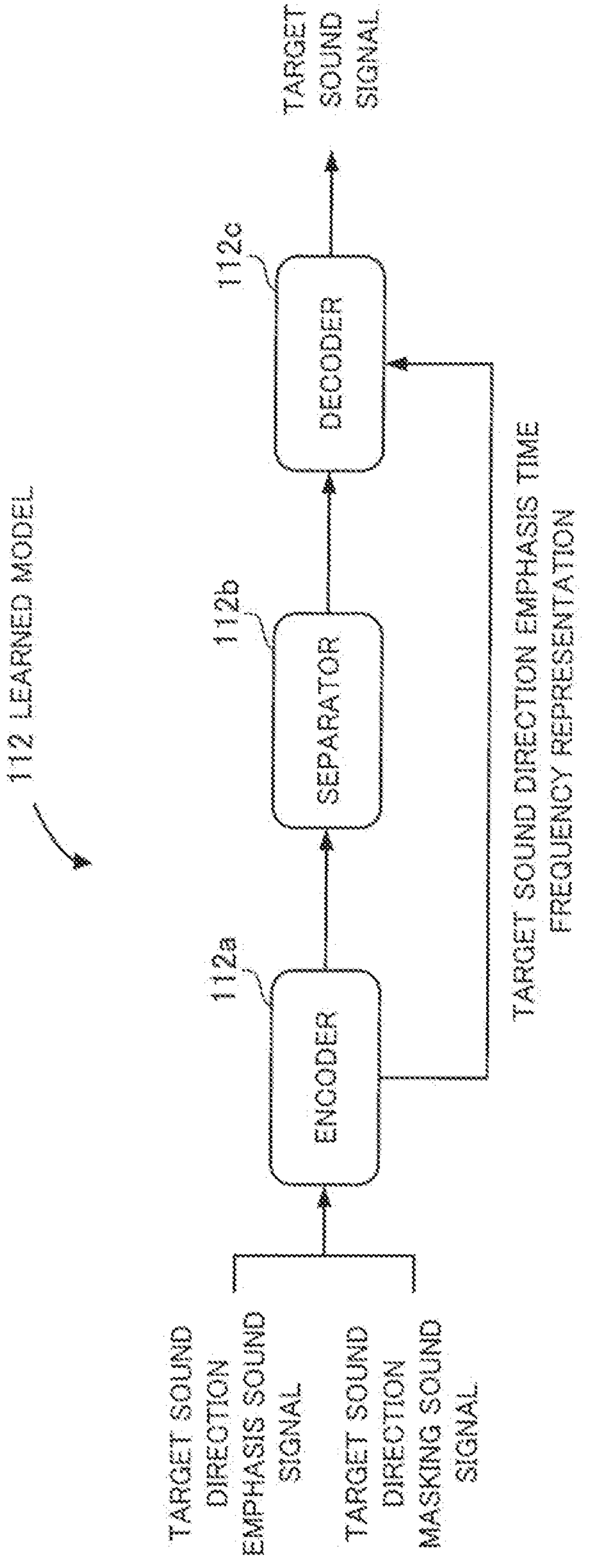
FIG. 4 is a diagram showing a configuration example of a learned model in the first embodiment.

FIG. 4 is a diagram showing a configuration example of the learned model in the first embodiment. The learned model 112 includes an encoder 112*a*, a separator 112*b* and a decoder 112*c*.

The encoder 112*a* estimates a target sound direction emphasis time frequency representation in terms of "M dimensions×time" based on the target sound direction emphasis sound signal. Further, the encoder 112*a* estimates a target sound direction masking time frequency representation in terms of "M dimensions×time" based on the target sound direction masking sound signal. For example, the encoder 112*a* may estimate power spectra estimated by means of STFT as the target sound direction emphasis time frequency representation and the target sound direction masking time frequency representation. Further, for example, the encoder 112*a* may estimate the target sound direction emphasis time frequency representation and the target sound direction masking time frequency representation by using a one-dimensional convolution operation. When the estimation is performed, the target sound direction emphasis time frequency representation and the target sound direction masking time frequency representation may be either projected onto the same time frequency representation space or projected onto different time frequency representation spaces. Incidentally, this estimation is described in Non-patent Reference 1, for example.

The separator 112*b* estimates a mask matrix in terms of "M dimensions×time" based on the target sound direction emphasis time frequency representation and the target sound direction masking time frequency representation. Further, when the target sound direction emphasis time frequency representation and the target sound direction masking time frequency representation are inputted to the separator 112*b*, the target sound direction emphasis time frequency representation and the target sound direction masking time frequency representation may be connected together in the frequency axis direction. By this, the target sound direction emphasis time frequency representation and the target sound direction masking time frequency representation are transformed into a representation in terms of "2M dimensions×time". The target sound direction emphasis time frequency representation and the target sound direction masking time frequency representation may also be connected together along an axis different from a time axis or a frequency axis. By this, the target sound direction emphasis time frequency representation and the target sound direction masking time frequency representation are transformed into a representation in terms of "M dimensions×time×2". The target sound direction emphasis time frequency representation and the target sound direction masking time frequency representation may be weighted by weights. The weighted target sound direction emphasis time frequency representation and the weighted target sound direction masking time frequency representation may be added together. The weights may be estimated by the learned model 112.

Incidentally, the separator 112*b* is a neural network formed by an input layer, an intermediate layer and an output layer. For example, a method as a combination of a method in the category of Long Short Term Memory (LSTM) and a one-dimensional convolution operation may be used for the propagation between a layer and a layer.

The decoder 112*c* multiplies the target sound direction emphasis time frequency representation in terms of "M dimensions×time" and the mask matrix in terms of "M dimensions×time" together. The decoder 112*c* outputs the target sound signal by using the information obtained by the multiplication and a method corresponding to the method used by the encoder 112*a*. For example, when the method used by the encoder 112*a* is STFT, the decoder 112*c* outputs the target sound signal by using the information obtained by the multiplication and ISTFT. Further, for example, when the method used by the encoder 112*a* is a one-dimensional convolution operation, the decoder 112*c* outputs the target sound signal by using the information obtained by the multiplication and an inverse one-dimensional convolution operation.

The target sound signal output unit 180 may output the target sound signal to a speaker. Accordingly, the target sound is outputted from the speaker. Incidentally, a drawing of the speaker is left out.

Next, a process executed by the information processing device 100 will be described below by using a flowchart.

Figure 5:
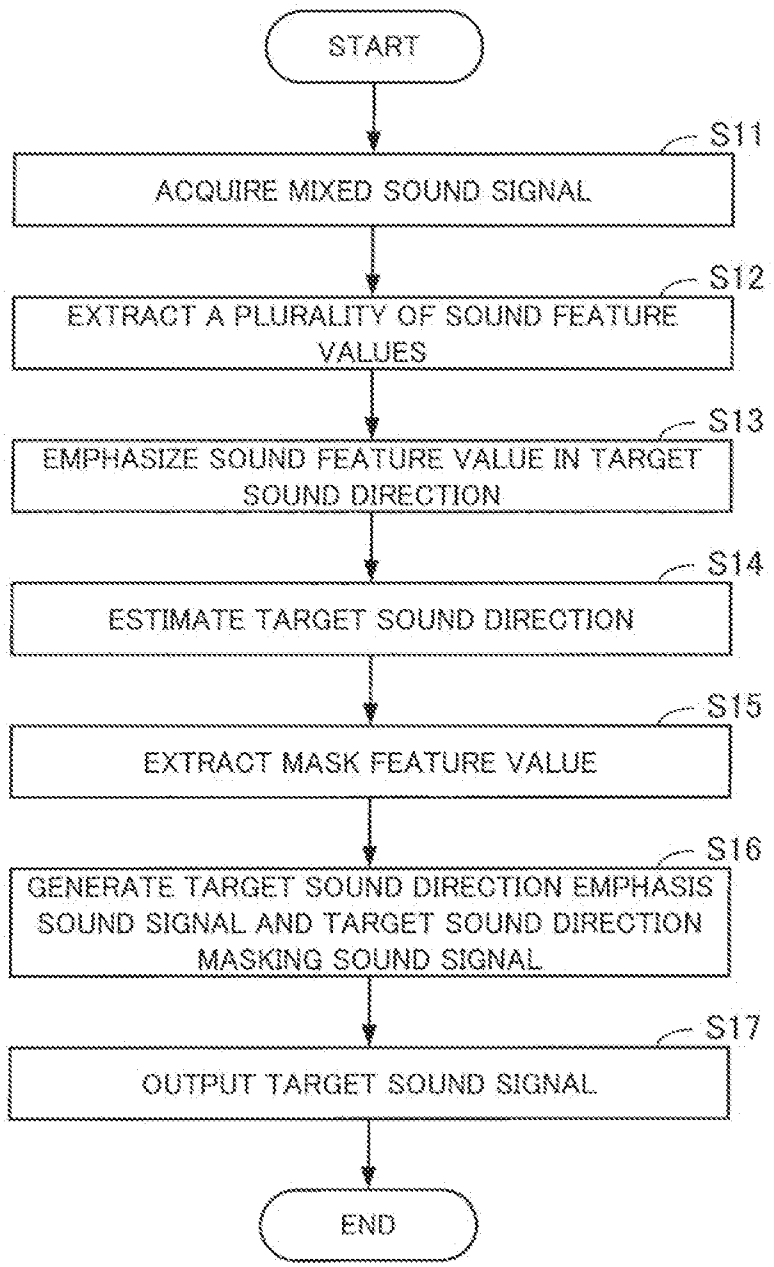
FIG. 5 is a flowchart showing an example of a process executed by the information processing device in the first embodiment.

FIG. 5 is a flowchart showing an example of the process executed by the information processing device in the first embodiment.

(Step S11) The acquisition unit 120 acquires the mixed sound signal.

(Step S12) The sound feature value extraction unit 130 extracts the plurality of sound feature values based on the mixed sound signal.

(Step S13) The emphasis unit 140 emphasizes the sound feature value in the target sound direction based on the sound source position information 111.

(Step S14) The estimation unit 150 estimates the target sound direction based on the plurality of sound feature values and the sound source position information 111.

(Step S15) The mask feature value extraction unit 160 extracts the mask feature value based on the estimated target sound direction and the plurality of sound feature values.

(Step S16) The generation unit 170 generates the target sound direction emphasis sound signal based on the sound feature value emphasized by the emphasis unit 140. Further, the generation unit 170 generates the target sound direction masking sound signal based on the mask feature value.

(Step S17) The target sound signal output unit 180 outputs the target sound signal by using the target sound direction emphasis sound signal, the target sound direction masking sound signal and the learned model 112.

Incidentally, the steps S14 and S15 may be executed in parallel with the step S13. Further, the steps S14 and S15 may be executed before the step S13.

Next, the learning phase will be described below.

<Learning Phase>

In the learning phase, an example of the generation of the learned model 112 will be described.

Figure 6:
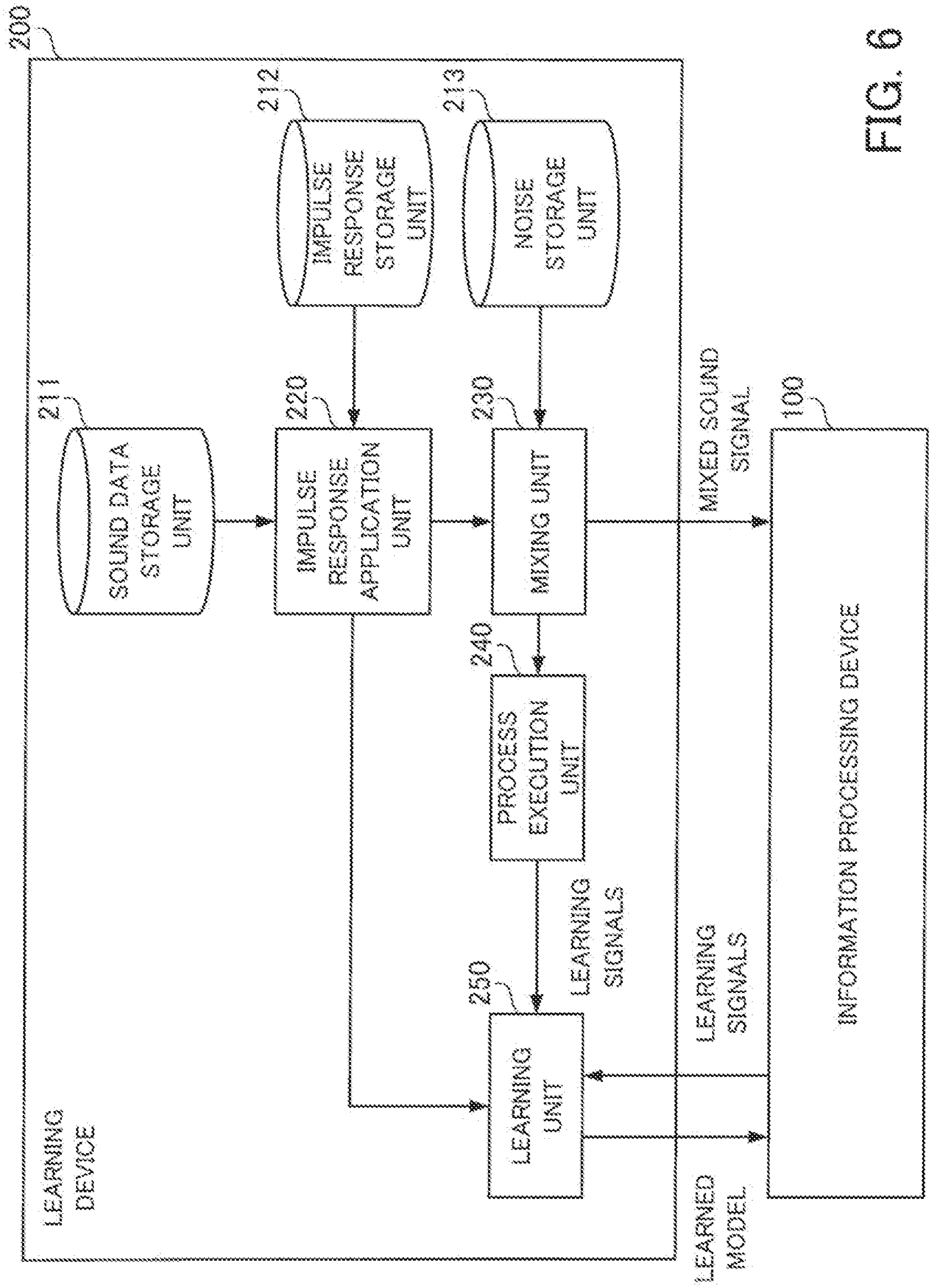
FIG. 6 is a block diagram showing functions of a learning device in the first embodiment.

FIG. 6 is a block diagram showing functions of the learning device in the first embodiment. The learning device 200 includes a sound data storage unit 211, an impulse response storage unit 212, a noise storage unit 213, an impulse response application unit 220, a mixing unit 230, a process execution unit 240 and a learning unit 250.

Further, the sound data storage unit 211, the impulse response storage unit 212 and the noise storage unit 213 may be implemented as storage areas secured by a volatile storage device or a nonvolatile storage device included in the learning device 200.

Part or all of the impulse response application unit 220, the mixing unit 230, the process execution unit 240 and the learning unit 250 may be implemented by a processing circuitry included in the learning device 200. Further, part or all of the impulse response application unit 220, the mixing unit 230, the process execution unit 240 and the learning unit 250 may be implemented as modules of a program executed by a processor included in the learning device 200.

The sound data storage unit 211 stores the target sound signal and a masking sound signal. Incidentally, the masking sound signal is a signal representing the masking sound. The impulse response storage unit 212 stores impulse response data. The noise storage unit 213 stores a noise signal. Incidentally, the noise signal is a signal representing the noise.

The impulse response application unit 220 convolves impulse response data corresponding to the position of the target sound and the position of the masking sound with one target sound signal stored in the sound data storage unit 211 and an arbitrary number of masking sound signals stored in the sound data storage unit 211.

The mixing unit 230 generates the mixed sound signal based on a sound signal outputted by the impulse response application unit 220 and the noise signal stored in the noise storage unit 213. It is also possible to handle the sound signal outputted by the impulse response application unit 220 as the mixed sound signal. The learning device 200 may transmit the mixed sound signal to the information processing device 100.

The process execution unit 240 generates the target sound direction emphasis sound signal and the target sound direction masking sound signal by executing the steps S11 to S16. In short, the process execution unit 240 generates the learning signals.

The learning unit 250 executes the learning by using the learning signals. In short, the learning unit 250 executes the learning for outputting the target sound signal by using the target sound direction emphasis sound signal and the target sound direction masking sound signal. Incidentally, in the learning, input weight coefficients as parameters of the neural network are determined. In the learning, a loss function described in the Non-patent Reference 1 may be used. Further, in the learning, an error may be calculated by using the sound signal outputted by the impulse response application unit 220 and the loss function. Then, in the learning, an optimization technique such as Adam is used and the input weight coefficient of each layer of the neural network is determined based on error back propagation, for example.

Incidentally, the learning signals may be either the learning signals generated by the process execution unit 240 or the learning signals generated by the information processing device 100.

Next, a process executed by the learning device 200 will be described below by using a flowchart.

Figure 7:
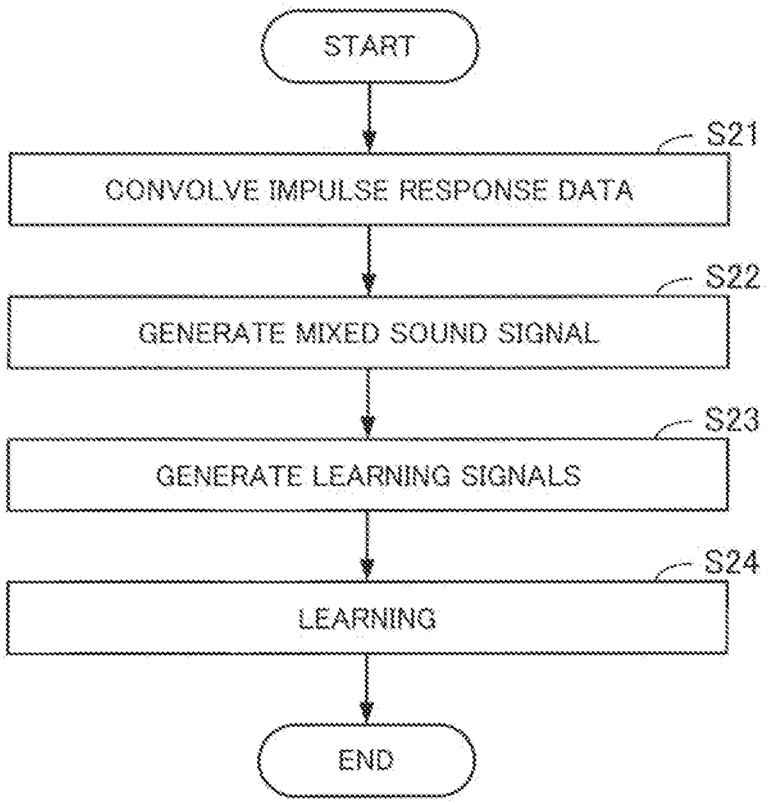
FIG. 7 is a flowchart showing an example of a process executed by the learning device in the first embodiment.

FIG. 7 is a flowchart showing an example of the process executed by the learning device in the first embodiment.

(Step S21) The impulse response application unit 220 convolves the impulse response data with the target sound signal and the masking sound signals.

(Step S22) The mixing unit 230 generates the mixed sound signal based on the sound signal outputted by the impulse response application unit 220 and the noise signal.

(Step S23) The process execution unit 240 generates the learning signals by executing the steps S11 to S16.

(Step S24) The learning unit 250 executes the learning by using the learning signals.

Then, the learning device 200 repeats the learning, by which the learned model 112 is generated.

According to the first embodiment, the information processing device 100 outputs the target sound signal by using the learned model 112. The learned model 112 is a learned model generated by the learning for outputting the target sound signal based on the target sound direction emphasis sound signal and the target sound direction masking sound signal. Specifically, the learned model 112 outputs the target sound signal even when the angle between the target sound direction and the masking sound direction is small by distinguishing between a target sound component having been emphasized or masked and a target sound component not having been emphasized or masked. Therefore, the information processing device 100 is capable of outputting the target sound signal by using the learned model 112 even when the angle between the target sound direction and the masking sound direction is small.

Second Embodiment

Next, a second embodiment will be described below. In the second embodiment, the description will be given mainly of features different from those in the first embodiment. In the second embodiment, the description will be omitted for features in common with the first embodiment.

Figure 8:
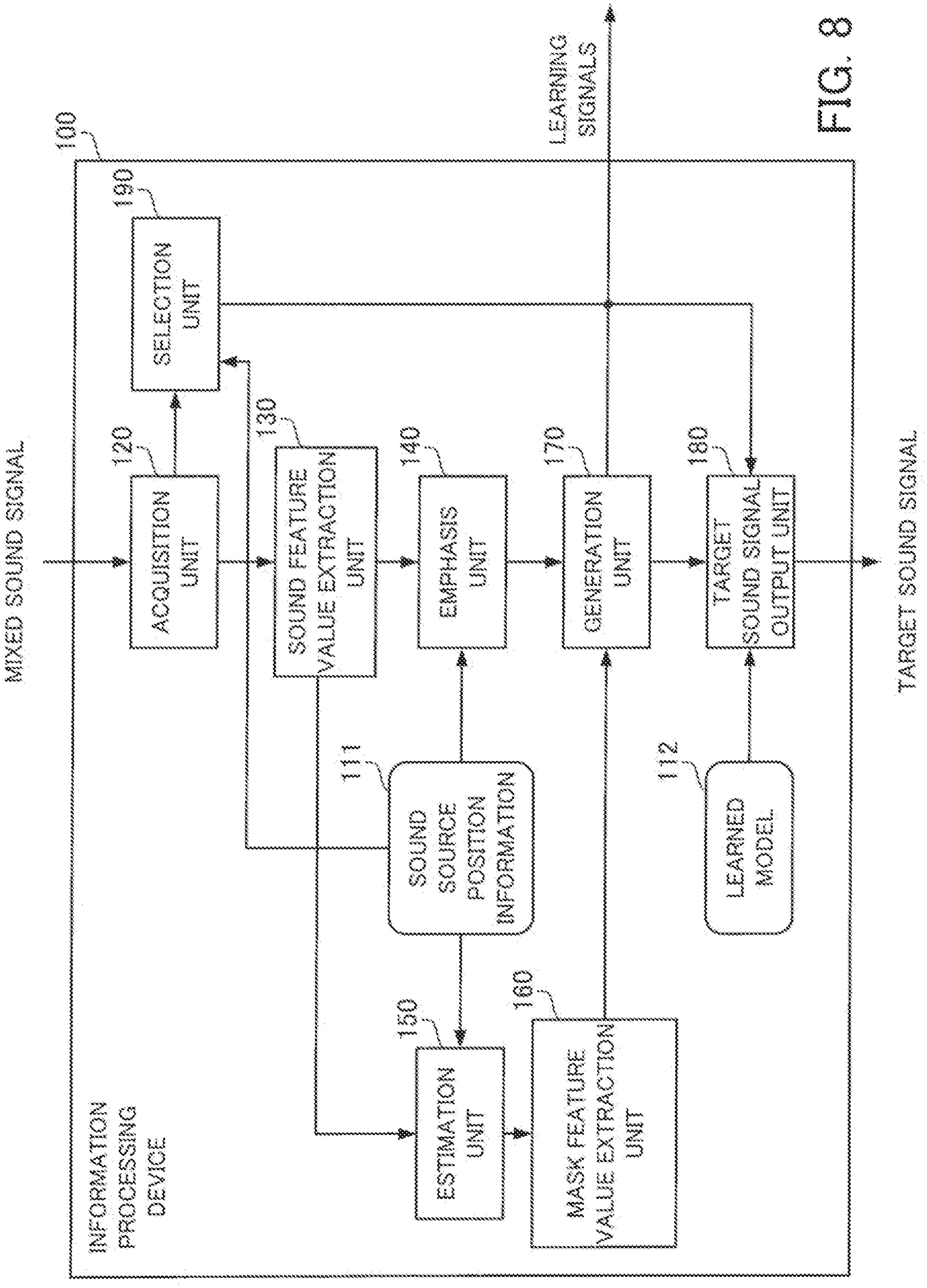
FIG. 8 is a block diagram showing functions of an information processing device in a second embodiment.

FIG. 8 is a block diagram showing functions of an information processing device in the second embodiment. The information processing device 100 further includes a selection unit 190.

Part or the whole of the selection unit 190 may be implemented by a processing circuitry. Further, part or the whole of the selection unit 190 may be implemented as modules of a program executed by the processor 101.

The selection unit 190 selects a sound signal in a channel in the target sound direction by using the mixed sound signal and the sound source position information 111. In other words, the selection unit 190 selects the sound signal in the channel in the target sound direction from the N sound signals based on the sound source position information 111.

Here, the selected sound signal, the target sound direction emphasis sound signal and the target sound direction masking sound signal may be inputted to the learning device 200 as the learning signals.

The target sound signal output unit 180 outputs the target sound signal by using the selected sound signal, the target sound direction emphasis sound signal, the target sound direction masking sound signal and the learned model 112.

Next, processes executed by the encoder 112*a*, the separator 112*b* and the decoder 112*c* included in the learned model 112 will be described below.

The encoder 112*a* estimates the target sound direction emphasis time frequency representation in terms of "M dimensions×time" based on the target sound direction emphasis sound signal. Further, the encoder 112*a* estimates the target sound direction masking time frequency representation in terms of "M dimensions×time" based on the target sound direction masking sound signal. Furthermore, the encoder 112*a* estimates a mixed sound time frequency representation in terms of "M dimensions×time" based on the selected sound signal. For example, the encoder 112*a* may estimate power spectra estimated by means of STFT as the target sound direction emphasis time frequency representation, the target sound direction masking time frequency representation and the mixed sound time frequency representation. Further, for example, the encoder 112*a* may estimate the target sound direction emphasis time frequency representation, the target sound direction masking time frequency representation and the mixed sound time frequency representation by using a one-dimensional convolution operation. When the estimation is performed, the target sound direction emphasis time frequency representation, the target sound direction masking time frequency representation and the mixed sound time frequency representation may be either projected onto the same time frequency representation space or projected onto different time frequency representation spaces. Incidentally, this estimation is described in the Non-patent Reference 1, for example.

The separator 112*b* estimates the mask matrix in terms of "M dimensions×time" based on the target sound direction emphasis time frequency representation, the target sound direction masking time frequency representation and the mixed sound time frequency representation. Further, when the target sound direction emphasis time frequency representation, the target sound direction masking time frequency representation and the mixed sound time frequency representation are inputted to the separator 112*b*, the target sound direction emphasis time frequency representation, the target sound direction masking time frequency representation and the mixed sound time frequency representation may be connected together in the frequency axis direction. By this, the target sound direction emphasis time frequency representation, the target sound direction masking time frequency representation and the mixed sound time frequency representation are transformed into a representation in terms of "3M dimensions×time". The target sound direction emphasis time frequency representation, the target sound direction masking time frequency representation and the mixed sound time frequency representation may also be connected together along an axis different from a time axis or a frequency axis. By this, the target sound direction emphasis time frequency representation, the target sound direction masking time frequency representation and the mixed sound time frequency representation are transformed into a representation in terms of "M dimensions×time×3". The target sound direction emphasis time frequency representation, the target sound direction masking time frequency representation and the mixed sound time frequency representation may be weighted by weights. The weighted target sound direction emphasis time frequency representation, the weighted target sound direction masking time frequency representation and the weighted mixed sound time frequency representation may be added together. The weights may be estimated by the learned model 112.

The process executed by the decoder 112*c* is the same as that in the first embodiment.

As above, the target sound signal output unit 180 outputs the target sound signal by using the selected sound signal, the target sound direction emphasis sound signal, the target sound direction masking sound signal and the learned model 112.

Next, a process executed by the information processing device 100 will be described below by using a flowchart.

Figure 9:
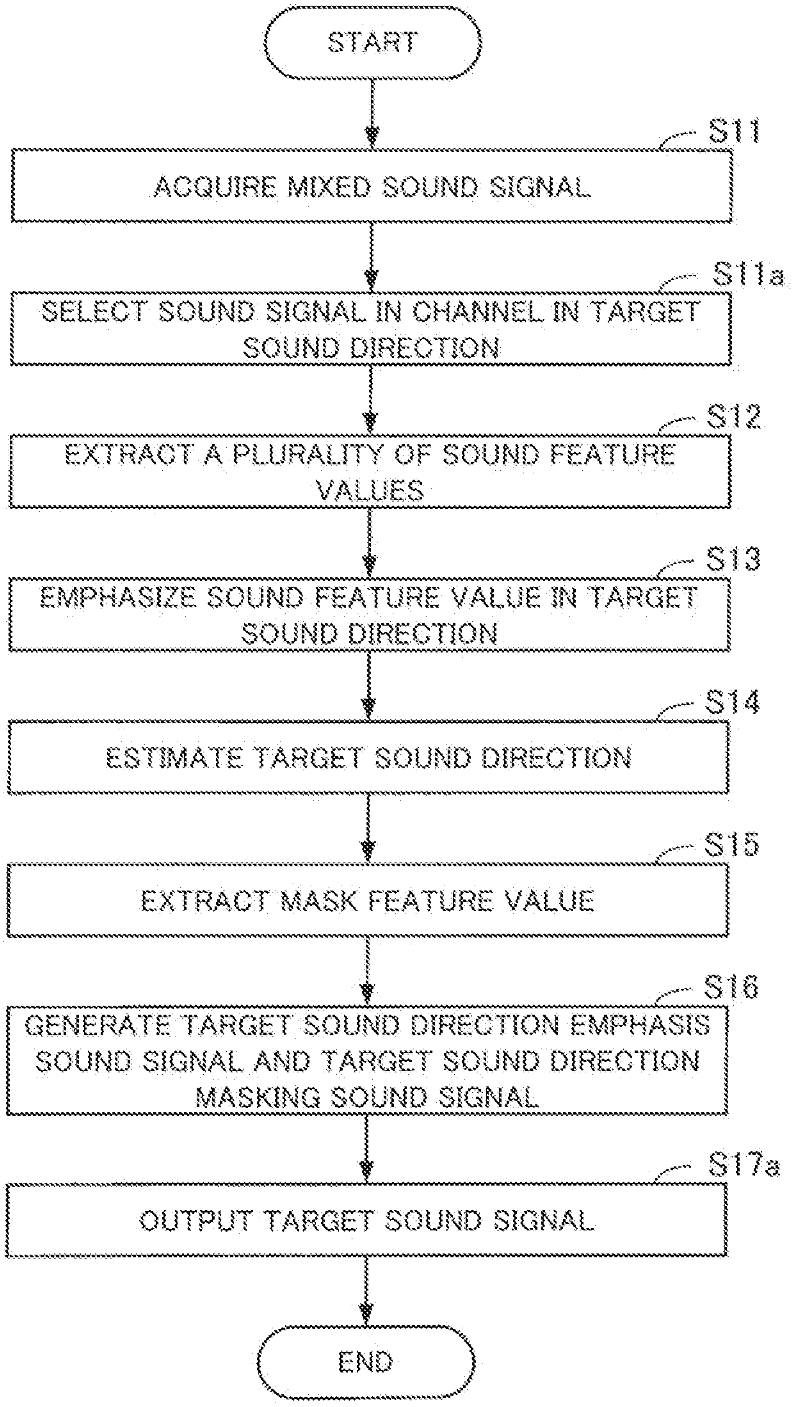
FIG. 9 is a flowchart showing an example of a process executed by the information processing device in the second embodiment.

FIG. 9 is a flowchart showing an example of the process executed by the information processing device in the second embodiment. The process of FIG. 9 differs from the process of FIG. 5 in that steps S11*a* and S17*a* are executed. Therefore, the steps S11*a* and S17*a* will be described below with reference to FIG. 9. Then, the description will be omitted for processing other than the steps S11*a* and S17*a*.

(Step S11*a*) The selection unit 190 selects the sound signal in the channel in the target sound direction by using the mixed sound signal and the sound source position information 111.

(Step S17*a*) The target sound signal output unit 180 outputs the target sound signal by using the selected sound signal, the target sound direction emphasis sound signal, the target sound direction masking sound signal and the learned model 112.

Incidentally, the step S11*a* may be executed at arbitrary timing as long as the step S11*a* is executed before the step S17*a* is executed.

Here, the generation of the learned model 112 will be described below. The learning device 200 executes the learning by using learning signals including the sound signal in the channel in the target sound direction (i.e., mixed sound signal in the target sound direction). For example, the learning signals may be generated by the process execution unit 240.

The learning device 200 learns the difference between the target sound direction emphasis sound signal and the mixed sound signal in the target sound direction. Further, the learning device 200 learns the difference between the target sound direction masking sound signal and the mixed sound signal in the target sound direction. The learning device 200 learns that a signal in a part where the difference is large is the target sound signal. The learning device 200 executes the learning as above, by which the learned model 112 is generated.

According to the second embodiment, the information processing device 100 is capable of outputting the target sound signal by using the learned model 112 obtained by the learning.

Third Embodiment

Next, a third embodiment will be described below. In the third embodiment, the description will be given mainly of features different from those in the first embodiment. In the third embodiment, the description will be omitted for features in common with the first embodiment.

Figure 10:
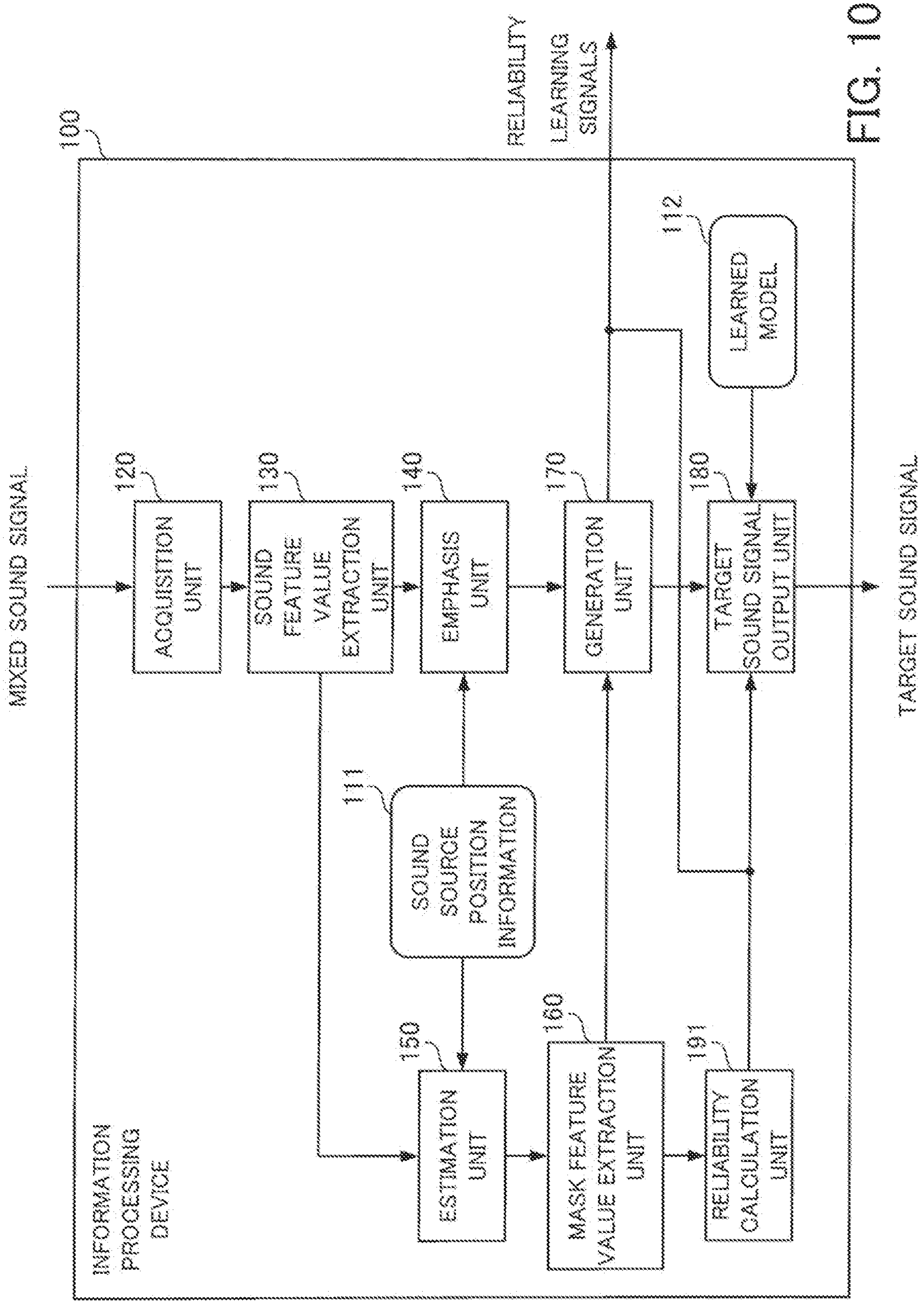
FIG. 10 is a block diagram showing functions of an information processing device in a third embodiment.

FIG. 10 is a block diagram showing functions of an information processing device in the third embodiment. The information processing device 100 further includes a reliability calculation unit 191.

Part or the whole of the reliability calculation unit 191 may be implemented by a processing circuitry. Further, part or the whole of the reliability calculation unit 191 may be implemented as modules of a program executed by the processor 101.

The reliability calculation unit 191 calculates reliability $F_i$ of the mask feature value by a predetermined method. The reliability $F_i$ of the mask feature value may be referred to also as reliability $F_i$ of the directional mask. The predetermined method is represented by the following expression (3). "ω" represents the angular range of the target sound direction. "θ" represents an angular range of a direction in which sound occurs.

$$F_i = \frac{\sum_{\omega} |a_{\omega,k} x_{tk}|^2}{\sum_{\theta} |a_{\theta,k} x_{tk}|^2} \quad (3)$$

The reliability $F_i$ is a matrix of the same size as the directional mask. Incidentally, the reliability $F_i$ may be inputted to the learning device 200.

The target sound signal output unit 180 outputs the target sound signal by using the reliability $F_i$, the target sound direction emphasis sound signal, the target sound direction masking sound signal and the learned model 112.

Next, processes executed by the encoder 112*a*, the separator 112*b* and the decoder 112*c* included in the learned model 112 will be described below.

The encoder 112*a* executes the following process in addition to the process in the first embodiment. The encoder 112*a* calculates a time frequency representation FT by multiplying a frame number T and a frequency bin number F of the reliability $F_i$ together. Incidentally, the frequency bin number F is the number of elements of the time frequency representation in the frequency axis direction. The frame number T is a number obtained by dividing the mixed sound signal by a predetermined time.

When the target sound direction emphasis time frequency representation and the time frequency representation FT coincide with each other, the time frequency representation FT is handled in the subsequent processes as the mixed sound time frequency representation in the second embodiment. When the target sound direction emphasis time frequency representation and the time frequency representation FT do not coincide with each other, the encoder 112*a* executes a transformation matrix conversion process. Specifically, the encoder 112*a* converts the number of elements of the reliability $F_i$ in the frequency axis direction into the number of elements of the target sound direction emphasis time frequency representation in the frequency axis direction.

When the target sound direction emphasis time frequency representation and the time frequency representation FT coincide with each other, the separator 112*b* executes the same process as the separator 112*b* in the second embodiment.

When the target sound direction emphasis time frequency representation and the time frequency representation FT do not coincide with each other, the separator 112*b* integrates the reliability $F_i$ whose number of elements in the frequency axis direction has been converted and the target sound direction emphasis time frequency representation together. For example, the separator 112*b* executes the integration by using an attention method described in Non-patent Reference 2. The separator 112*b* estimates the mask matrix in terms of "M dimensions×time" based on a target sound direction emphasis time frequency representation obtained by the integration and the target sound direction masking time frequency representation.

The process executed by the decoder 112*c* is the same as that in the first embodiment.

As above, the target sound signal output unit 180 outputs the target sound signal by using the reliability $F_i$, the target sound direction emphasis sound signal, the target sound direction masking sound signal and the learned model 112.

Next, a process executed by the information processing device 100 will be described below by using a flowchart.

Figure 11:
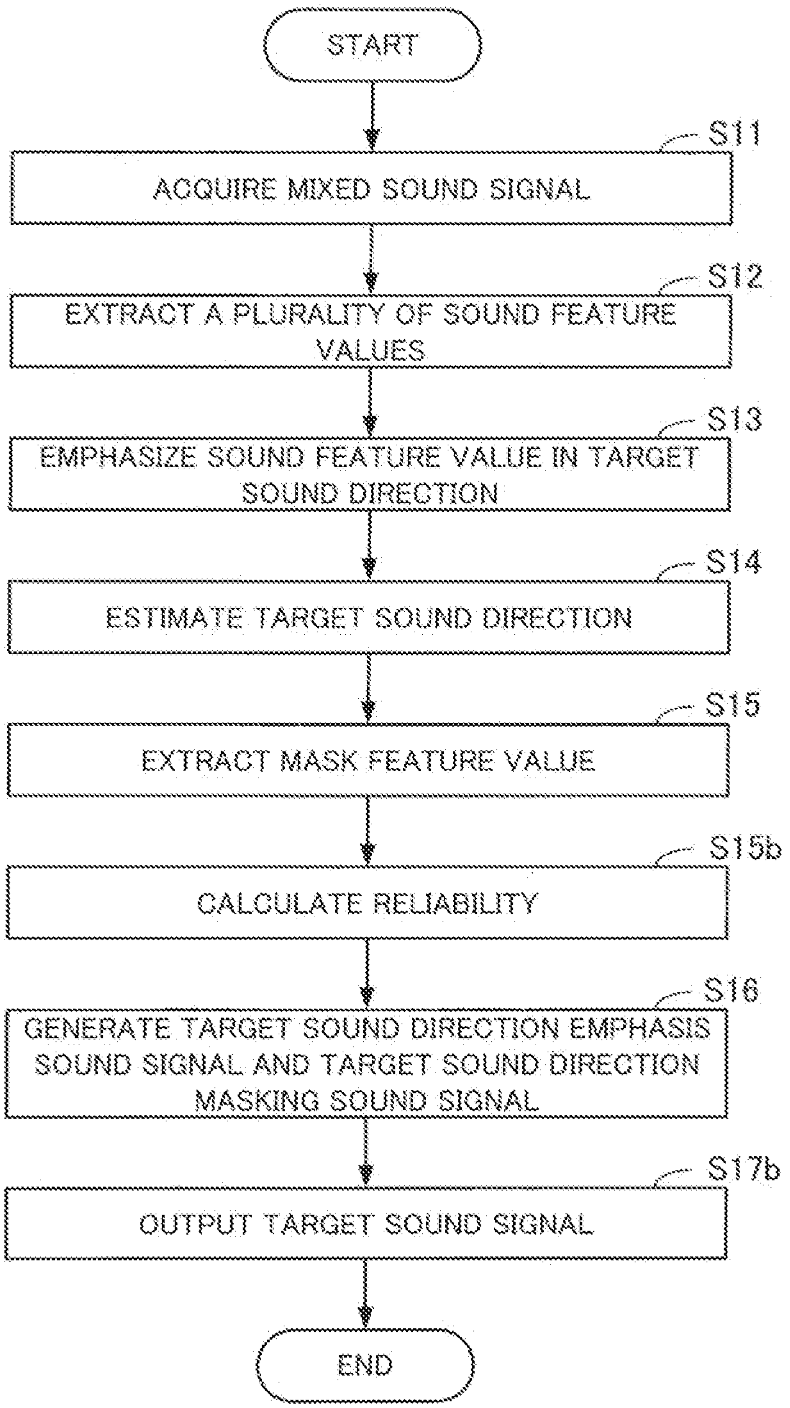
FIG. 11 is a flowchart showing an example of a process executed by the information processing device in the third embodiment.

FIG. 11 is a flowchart showing an example of the process executed by the information processing device in the third embodiment. The process of FIG. 11 differs from the process of FIG. 5 in that steps S15*b* and S17*b* are executed. Therefore, the steps S15*b* and S17*b* will be described below with reference to FIG. 11. Then, the description will be omitted for processing other than the steps S15*b* and S17*b*.

(Step S15*b*) The reliability calculation unit 191 calculates the reliability $F_i$ of the mask feature value.

(Step S17*b*) The target sound signal output unit 180 outputs the target sound signal by using the reliability $F_i$, the target sound direction emphasis sound signal, the target sound direction masking sound signal and the learned model 112.

Here, the generation of the learned model 112 will be described below. When executing the learning, the learning device 200 executes the learning by using the reliability $F_i$. The learning device 200 may execute the learning by using the reliability $F_i$ acquired from the information processing device 100. The learning device 200 may execute the learning by using the reliability $F_i$ stored in the volatile storage device or the nonvolatile storage device included in the learning device 200. The learning device 200 determines how much the target sound direction masking sound signal should be taken into consideration by using the reliability $F_i$. The learning device 200 executes learning for making the determination, by which the learned model 112 is generated.

According to the third embodiment, the target sound direction emphasis sound signal and the target sound direction masking sound signal are inputted to the learned model 112. The target sound direction masking sound signal is generated based on the mask feature value. The learned model 112 determines how much the target sound direction masking sound signal should be taken into consideration by using the reliability $F_i$ of the mask feature value. The learned model 112 outputs the target sound signal based on the determination. As above, the information processing device 100 is capable of outputting a more appropriate target sound signal by inputting the reliability $F_i$ to the learned model 112.

Fourth Embodiment

Next, a fourth embodiment will be described below. In the fourth embodiment, the description will be given mainly of features different from those in the first embodiment. In the fourth embodiment, the description will be omitted for features in common with the first embodiment.

Figure 12:
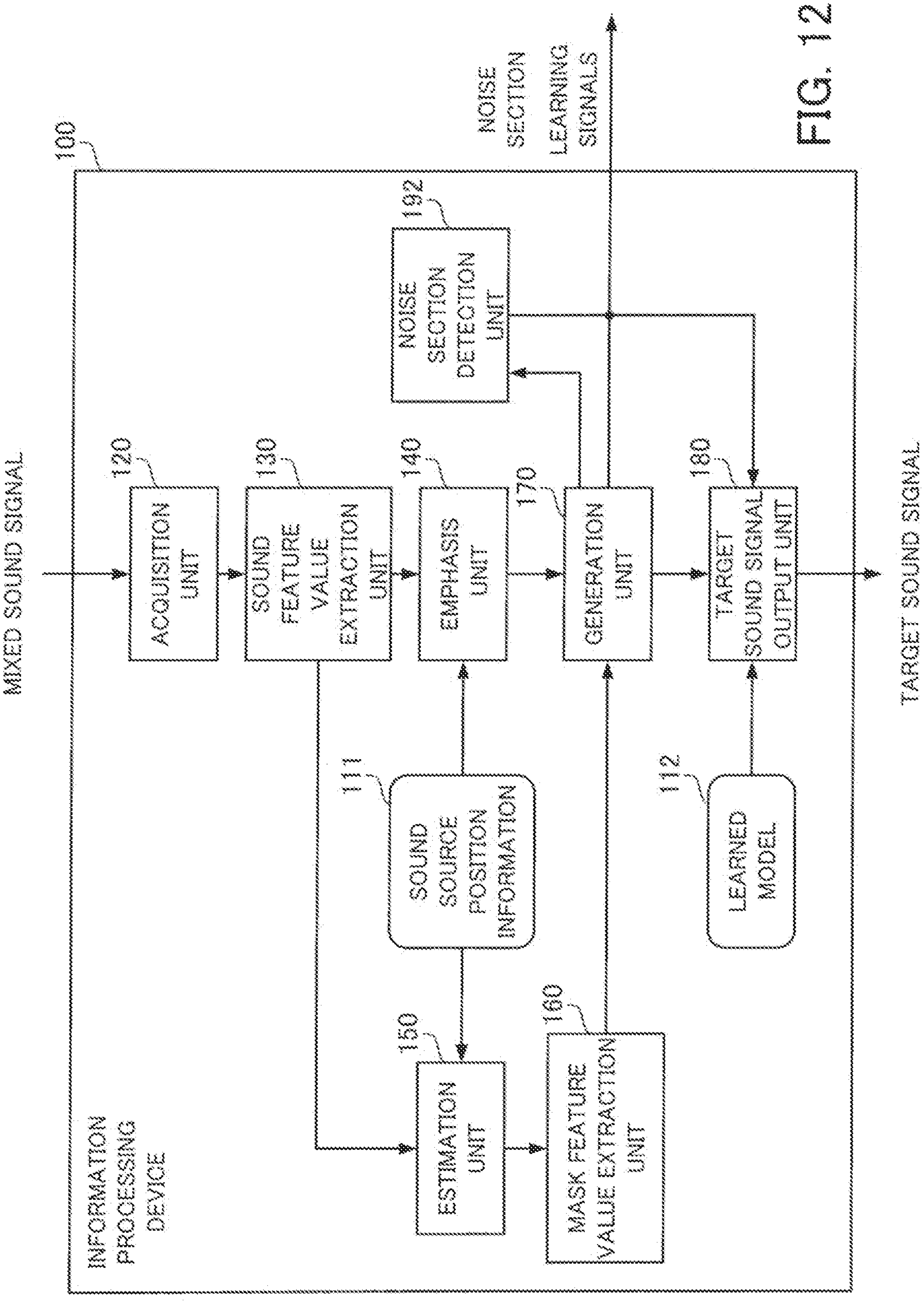
FIG. 12 is a block diagram showing functions of an information processing device in a fourth embodiment.

FIG. 12 is a block diagram showing functions of an information processing device in the fourth embodiment. The information processing device 100 further includes a noise section detection unit 192.

Part or the whole of the noise section detection unit 192 may be implemented by a processing circuitry. Further, part or the whole of the noise section detection unit 192 may be implemented as modules of a program executed by the processor 101.

The noise section detection unit 192 detects a noise section based on the target sound direction emphasis sound signal. For example, the noise section detection unit 192 uses a method described in the Non-patent Reference 2 when detecting the noise section. For example, the noise section detection unit 192 detects speech sections based on the target sound direction emphasis sound signal and thereafter corrects a starting end time of each speech section and a terminal end time of each speech section and thereby identifies the speech sections. The noise section detection unit 192 detects the noise section by excluding the identified speech sections from a section representing the target sound direction emphasis sound signal. Here, the detected noise section may be inputted to the learning device 200.

The target sound signal output unit 180 outputs the target sound signal by using the detected noise section, the target sound direction emphasis sound signal, the target sound direction masking sound signal and the learned model 112.

Next, processes executed by the encoder 112*a*, the separator 112*b* and the decoder 112*c* included in the learned model 112 will be described below.

The encoder 112*a* executes the following process in addition to the process in the first embodiment. The encoder 112*a* estimates a non-target sound time frequency representation in terms of "M dimensions×time" based on a signal corresponding to the noise section of the target sound direction emphasis sound signal. For example, the encoder 112*a* may estimate a power spectrum estimated by means of STFT as the non-target sound time frequency representation. Further, for example, the encoder 112*a* may estimate the non-target sound time frequency representation by using a one-dimensional convolution operation. When the estimation is performed, the non-target sound time frequency representation may be either projected onto the same time frequency representation space or projected onto a different time frequency representation space. Incidentally, this estimation is described in the Non-patent Reference 1, for example.

The separator 112*b* integrates the non-target sound time frequency representation and the target sound direction emphasis time frequency representation together. For example, the separator 112*b* executes the integration by using the attention method described in the Non-patent Reference 2. The separator 112*b* estimates the mask matrix in terms of "M dimensions×time" based on a target sound direction emphasis time frequency representation obtained by the integration and the target sound direction masking time frequency representation.

Incidentally, the separator 112*b* is capable of estimating a tendency of the noise based on the non-target sound time frequency representation, for example.

The process executed by the decoder 112*c* is the same as that in the first embodiment.

Next, a process executed by the information processing device 100 will be described below by using a flowchart.

Figure 13:
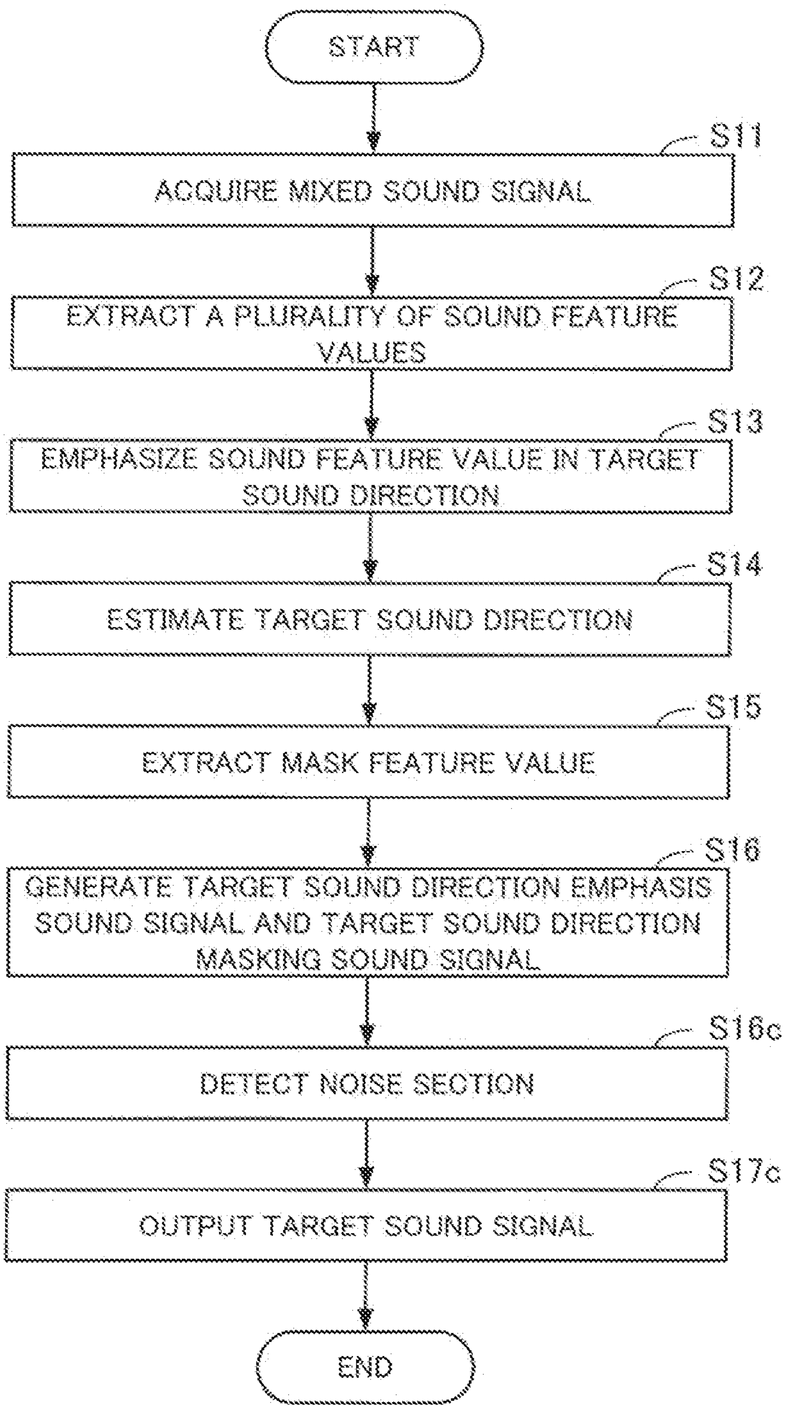
FIG. 13 is a flowchart showing an example of a process executed by the information processing device in the fourth embodiment.

FIG. 13 is a flowchart showing an example of the process executed by the information processing device in the fourth embodiment. The process of FIG. 13 differs from the process of FIG. 5 in that steps S16*c* and S17*c* are executed. Therefore, the steps S16*c* and S17*c* will be described below with reference to FIG. 13. Then, the description will be omitted for processing other than the steps S16*c* and S17*c*.

(Step S16*c*) The noise section detection unit 192 detects the noise section as section representing the noise based on the target sound direction emphasis sound signal.

(Step S17*c*) The target sound signal output unit 180 outputs the target sound signal by using the noise section, the target sound direction emphasis sound signal, the target sound direction masking sound signal and the learned model 112.

Here, the generation of the learned model 112 will be described below. When executing the learning, the learning device 200 executes the learning by using the noise section. The learning device 200 may execute the learning by using the noise section acquired from the information processing device 100. The learning device 200 may execute the learning by using the noise section detected by the process execution unit 240. The learning device 200 learns the tendency of the noise based on the noise section. The learning device 200 executes the learning for outputting the target sound signal based on the target sound direction emphasis sound signal and the target sound direction masking sound signal and in consideration of the tendency of the noise. The learning device 200 executes the learning as above, by which the learned model 112 is generated.

According to the fourth embodiment, the noise section is inputted to the learned model 112. The learned model 112 estimates the tendency of the noise included in the target sound direction emphasis sound signal and the target sound direction masking sound signal based on the noise section. The learned model 112 outputs the target sound signal based on the target sound direction emphasis sound signal and the target sound direction masking sound signal and in consideration of the tendency of the noise. Since the information processing device 100 outputs the target sound signal in consideration of the tendency of the noise, the information processing device 100 is capable of outputting a more appropriate target sound signal.

Features in the embodiments described above can be appropriately combined with each other.

DESCRIPTION OF REFERENCE CHARACTERS

100: information processing device, 101: processor, 102: volatile storage device, 103: nonvolatile storage device, 111: sound source position information, 112: learned model, 120: acquisition unit, 130: sound feature value extraction unit, 140: emphasis unit, 150: estimation unit, 160: mask feature value extraction unit, 170: generation unit, 180: target sound signal output unit, 190: selection unit, 191: reliability calculation unit, 192: noise section detection unit, 200: learning device, 211: sound data storage unit, 212: impulse response storage unit, 213: noise storage unit, 220: impulse response application unit, 230: mixing unit, 240: process execution unit, 250: learning unit.

What is claimed is:

1. An information processing device comprising:

acquiring circuitry to acquire sound source position information as position information on a sound source of a target sound, a mixed sound signal as a signal representing a mixed sound including the target sound and a masking sound, and a learned model;

sound feature value extracting circuitry to extract a plurality of sound feature values based on the mixed sound signal, the plurality of sound feature values being a time series of power spectra obtained by performing short-time Fourier transform (STFT) on the mixed sound signal;

emphasizing circuitry to emphasize a sound feature value in a target sound direction as a direction of the target sound among the plurality of sound feature values based on the sound source position information thereby amplifying a particular part of the power spectra in the time series relative to other parts, wherein the target sound direction is the direction from which the target sound is emitted from the sound source of the target sound;

estimating circuitry to estimate the target sound direction based on the plurality of sound feature values and the sound source position information;

mask feature value extracting circuitry to extract a mask feature value, as a feature value in a state in which a feature value in the target sound direction is masked, based on the estimated target sound direction and the plurality of sound feature values;

generating circuitry to generate a target sound direction emphasis sound signal, as a sound signal in which the sound of the target sound direction is emphasized, based on the emphasized sound feature value and generate a target sound direction masking sound signal, as a sound signal in which the sound of the target sound direction is masked, based on the mask feature value; and target sound signal outputting circuitry to output a target sound signal as a signal representing the target sound by using the target sound direction emphasis sound signal, the target sound direction masking sound signal and the learned model.

2. The information processing device according to claim 1, further comprising selecting circuitry to select a sound signal in a channel in the target sound direction by using the mixed sound signal and the sound source position information, wherein the target sound signal outputting circuitry outputs the target sound signal by using the selected sound signal, the target sound direction emphasis sound signal, the target sound direction masking sound signal and the learned model.

3. The information processing device according to claim 1, further comprising reliability calculating circuitry to calculate reliability of the mask feature value by a predetermined method, wherein the target sound signal outputting circuitry outputs the target sound signal by using the reliability, the target sound direction emphasis sound signal, the target sound direction masking sound signal and the learned model.

4. The information processing device according to claim 1, wherein the mixed sound includes noise.

5. The information processing device according to claim 4, further comprising noise section detecting circuitry to detect a noise section as a section representing the noise based on the target sound direction emphasis sound signal, wherein the target sound signal outputting circuitry outputs the target sound signal by using the noise section, the target sound direction emphasis sound signal, the target sound direction masking sound signal and the learned model.

6. An output method performed by an information processing device, the output method comprising:

acquiring sound source position information as position information on a sound source of a target sound, a mixed sound signal as a signal representing a mixed sound including the target sound and a masking sound, and a learned model;

extracting a plurality of sound feature values based on the mixed sound signal, the plurality of sound feature values being a time series of power spectra obtained by performing short-time Fourier transform (STFT) on the mixed sound signal;

emphasizing a sound feature value in a target sound direction as a direction of the target sound among the plurality of sound feature values based on the sound source position information thereby amplifying a particular part of the power spectra in the time series relative to other parts, wherein the target sound direction is the direction from which the target sound is emitted from the sound source of the target sound;

estimating the target sound direction based on the plurality of sound feature values and the sound source position information;

extracting a mask feature value, as a feature value in a state in which a feature value in the target sound direction is masked, based on the estimated target sound direction and the plurality of sound feature values;

generating a target sound direction emphasis sound signal, as a sound signal in which the sound of the target sound direction is emphasized, based on the emphasized sound feature value, generating a target sound direction masking sound signal, as a sound signal in which the sound of the target sound direction is masked, based on the mask feature value; and outputting a target sound signal as a signal representing the target sound by using the target sound direction emphasis sound signal, the target sound direction masking sound signal and the learned model.

7. An information processing device comprising:

a processor to execute a program; and a memory to store the program which, when executed by the processor, performs processes of, acquiring sound source position information as position information on a sound source of a target sound, a mixed sound signal as a signal representing a mixed sound including the target sound and a masking sound, and a learned model, extracting a plurality of sound feature values based on the mixed sound signal, the plurality of sound feature values being a time series of power spectra obtained by performing short-time Fourier transform (STFT) on the mixed sound signal, emphasizing a sound feature value in a target sound direction as a direction of the target sound among the plurality of sound feature values based on the sound source position information thereby amplifying a particular part of the power spectra in the time series relative to other parts, wherein the target sound direction is the direction from which the target sound is emitted from the sound source of the target sound, estimating the target sound direction based on the plurality of sound feature values and the sound source position information, extracting a mask feature value, as a feature value in a state in which a feature value in the target sound direction is masked, based on the estimated target sound direction and the plurality of sound feature values, generating a target sound direction emphasis sound signal, as a sound signal in which the sound of the target sound direction is emphasized, based on the emphasized sound feature value, generating a target sound direction masking sound signal, as a sound signal in which the sound of the target sound direction is masked, based on the mask feature value, and outputting a target sound signal as a signal representing the target sound by using the target sound direction emphasis sound signal, the target sound direction masking sound signal and the learned model.

* * * * *